UNITED STATES PATENT OFFICE.

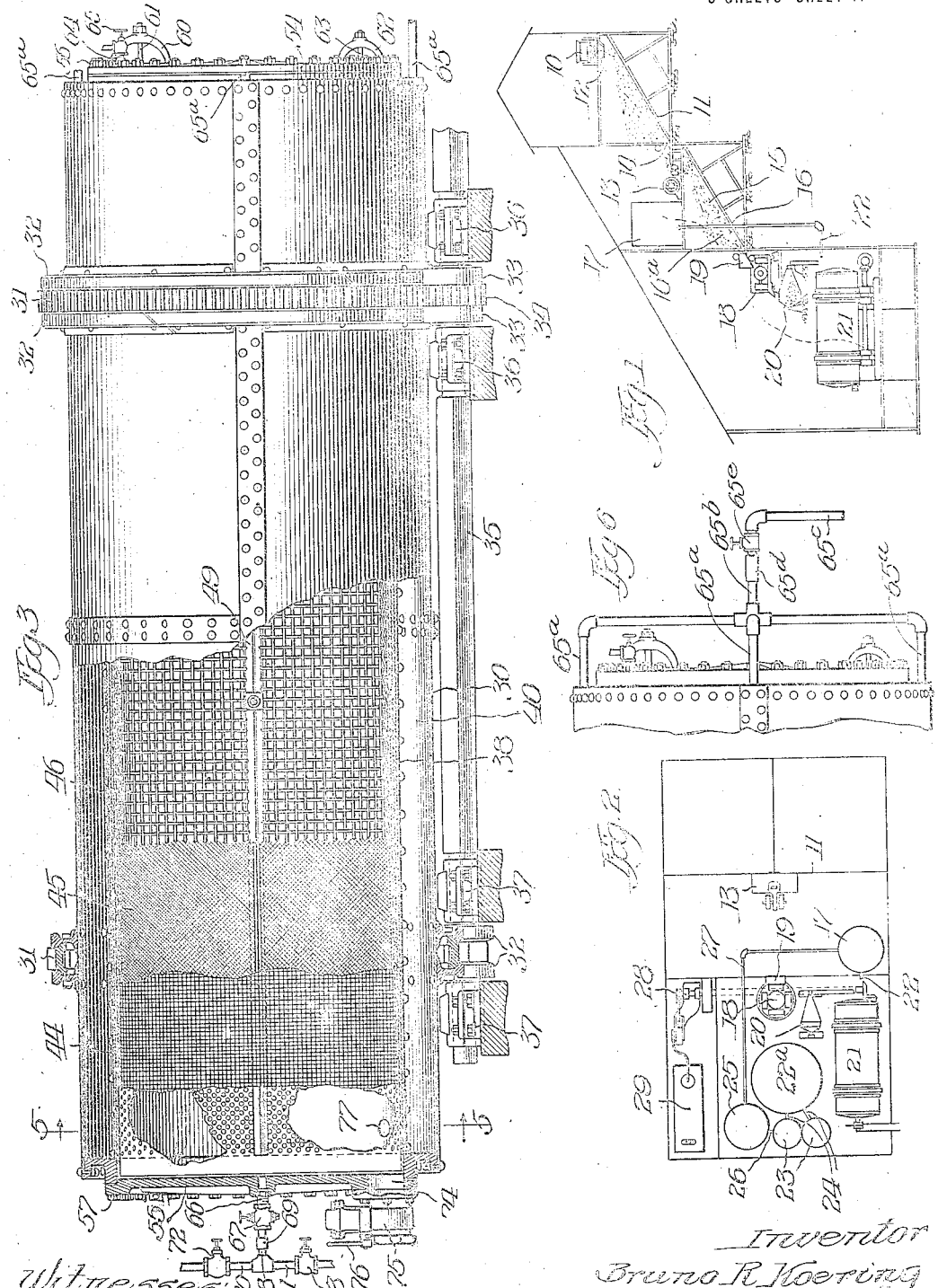

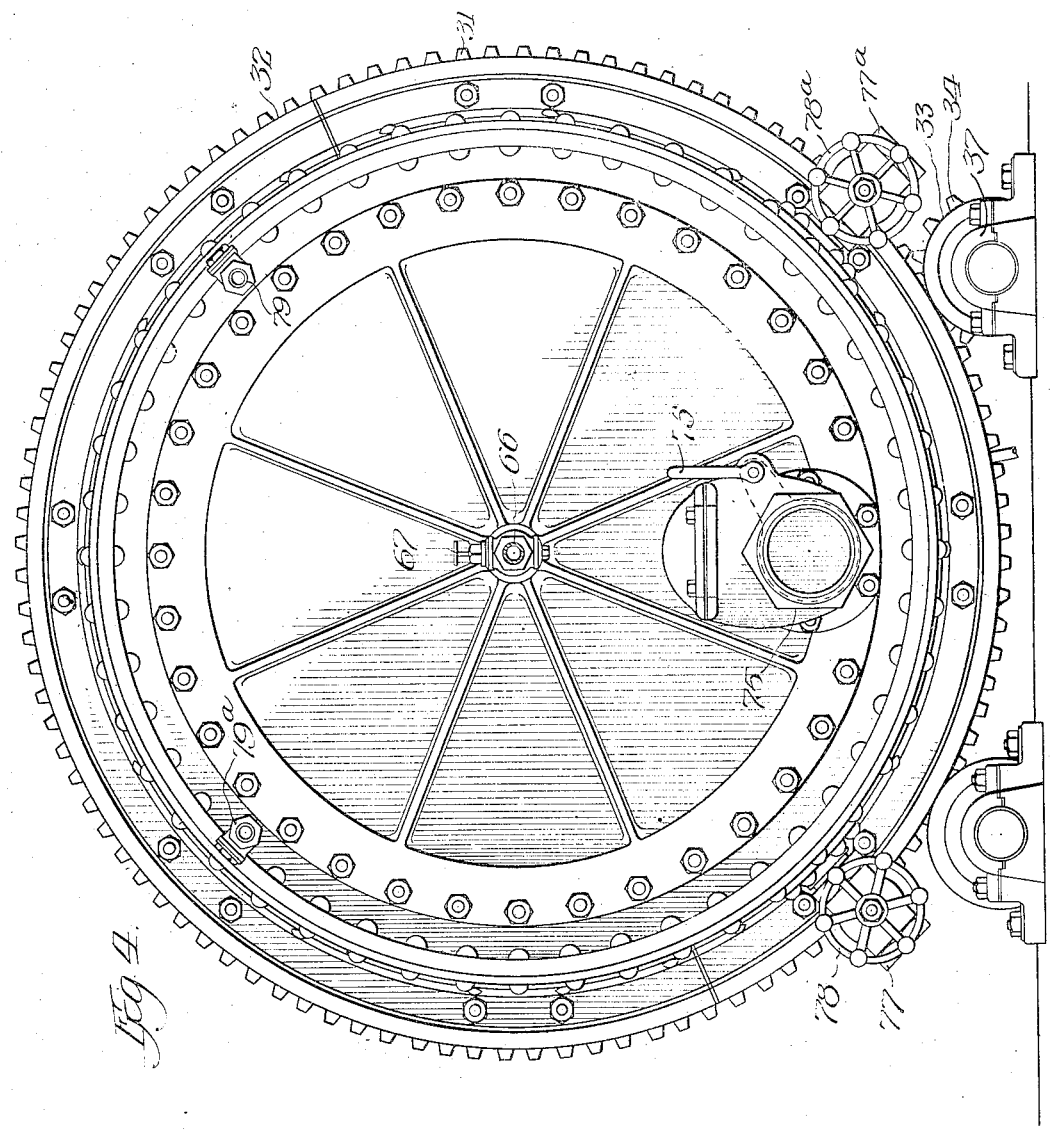

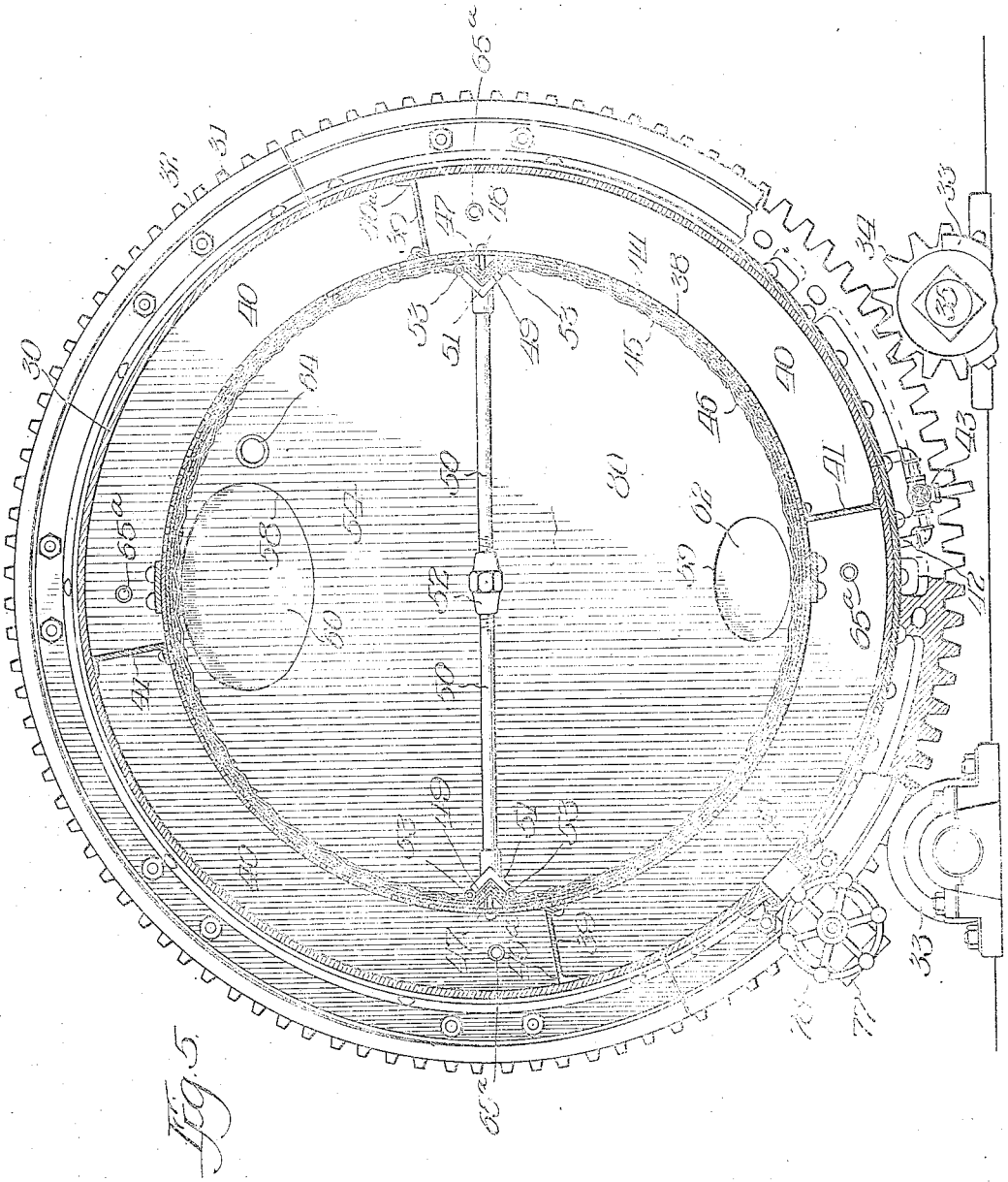

BRUNO R. KOERING, OF DETROIT, MICHIGAN, ASSIGNOR TO KOERING CYANIDING PROCESS COMPANY, OF DETROIT, MICHIGAN, A CORPORATION OF ARIZONA.

APPARATUS FOR THE RECOVERY OF PRECIOUS METALS.

1,163,828.

Specification of Letters Patent.   Patented Dec. 14, 1915.

Application filed July 27, 1914.   Serial No. 853,350.

*To all whom it may concern:*

Be it known that I, BRUNO R. KOERING, a citizen of the United States, residing at Detroit, in the county of Wayne and State of Michigan, have invented certain new and useful Improvements in Apparatus for the Recovery of Precious Metals, of which the following is a specification.

My invention relates to apparatus for the recovery of precious metals, and refers particularly to the chemical treatment of the ores of gold and silver.

It is well known that after ores of the precious metals, such as gold and silver, have been finely crushed the metals are recovered from the ores by a chemical treatment—in the case of gold, by cyaniding or chlorination, and in the case of silver, by hypo-sulfiting.

As heretofore carried out, the process and apparatus for chemically treating the ores for the purpose just described have been cumbersome, inefficient, and slow in action. The principal operations have consisted, first, in agitating the ore with the solution in order to obtain thorough percolation by the solution to cause it to dissolve the precious metals present; second, the separation of the solution from the pulp and slimes resulting from treatment of the ore; third, the filtration of the metal bearing solution in order to obtain it in a clear condition preparatory to precipitation of the precious metals; and, fourth, washing of the pulp and slimes in order to free them from all traces of the metal bearing solution. These operations have required large and expensive tanks and various complicated apparatus for agitating, washing and filtering. As an example of the complication of the treatment it may be mentioned that it has been customary in the case of wet, crushed ores to first expel a certain percentage of moisture in a machine called a "thickener," and in many cases where fine grinding has been used and the ore contains a considerable portion of clay the so-called slimes thus formed have been separated on a slime table from the silicious residue, which is the pulp free from slimes.

It is the object of my invention to simplify the process of extracting the metal from the ores by eliminating the various complicated apparatus heretofore used and conducting the entire extracting operation in a single machine. This machine is preferably in the form of a rotatable drum, and is so constructed, as will be described in detail hereafter, that the agitation of the solution with the ore (leaching), the separation of the metal bearing solution and filtration of the latter, and the washing of the pulp and slimes may all be efficiently conducted without the necessity of separating the pulp from the slimes or transferring the ore or solution to various tanks and other apparatus for conducting the various steps of the extraction process. After the extraction process has been completely carried out in my improved apparatus, the pulp and slimes may be quickly sluiced out of the drum and the latter is ready for a new charge of ore. Not only is my apparatus economical in its first cost of installation and in its operation, but it also saves much time in the carrying out of the extracting process.

These and other advantages of my invention will be more readily understood by reference to the accompanying drawings, which represent a preferred form of apparatus for carrying out my invention, and in which—

Figure 1 is a diagrammatic side elevation of a plant in which my apparatus and process are used; Fig. 2 is a diagrammatic plan of the plant shown in Fig. 1; Fig. 3 is a side elevation and partial longitudinal section showing my improved extraction drum; Fig. 4 is an end elevation of the drum shown in Fig. 3; Fig. 5 is a transverse section taken on the line 5—5 of Fig. 3; and Fig. 6 is a fragmentary side elevation of the extraction drum, showing the pipes for discharging the solution during rotation of the drum.

In order that the purpose of my invention may be more clearly understood, I will first describe a typical plant, as shown in Figs. 1 and 2. The ore from the mine is brought to the plant on a car 10, and this ore is then placed in a bin 11 by dumping through the hopper 12. The mine-run ore in the bin 11 is then fed to the crusher 13, being admitted from the bin 11 through the gate 14. The crushed ore 15 is then stored in the bin 16. The stock solution tank 17 may be located on the same floor with the crusher 13. The crushed ore 16ª is supplied to the mill 18 by means of the automatic feeder 19. From the mill 18 the ore passes to the pebble mill 20, the function of the mill 18 and the pebble mill being to reduce the ore to a very fine condition. The finely crushed ore from the pebble mill is then charged into the extraction drum 21, which forms the subject-matter of the present invention. A pipe 22 leads from the stock solution tank 17 and serves to supply the cyanid or other suitable solution to the extraction drum 21.

After the extraction operation has been completed the solution bearing the precious metals is conveyed through suitable pipes or otherwise to the solution tank 22ª, from which the metal bearing solution is supplied to the precipitation tanks 23 through the pipes 24. The precipitation tanks 23 are of special construction, but they form no part of the present invention. After the metals have been precipitated from the solution in the tanks 23, this solution is then conveyed to the sump tank 25 through the pipe 26, after which the solution is returned to the stock solution tank 17 through the pipe 27. In order to operate the crusher 13 and the mills 18 and 20 and the extraction drum 21, an engine 28 operated from the boiler 29 is provided.

Having thus described the applicability of my invention in connection with the complete operation of the recovery of precious metals from their ores, I will now pass to a detailed description of the extraction drum used in my invention.

The extraction drum 21 consists of a circular outer shell 30, of steel or other suitable material, on which are mounted the gears 31 near each end of the drum. Immediately adjacent to each of the gears 31 are the drum tracks 32, which engage the idlers 33, these idlers thereby serving to support the drum. Each of the gears 31 is engaged by a pinion 34 which is mounted on the main driving shaft 35 carried in the bearings 36, 36 and 37, 37. The driving shaft 35 is rotated from any suitable source of power, as, for example, from the engine 28 shown in Fig. 2. On rotation of the driving shaft 35 it will be evident that the extraction drum 21 is rotated on its longitudinal axis by reason of the engagement of the pinions 34 with the gears 31.

Separated from the outer shell 30 by an annular space is the inner perforated shell 38, which is held in position by the longitudinally disposed beams 39 and 41 which form division walls of the solution compartment 40 located between the outer shell 30 and the inner perforated shell 38. As clearly shown in Fig. 5, the division walls 39 are provided with passages 40ª, preferably adjacent to the outer shell 30 for a purpose which will presently be described. The division walls 41 are not provided with such a passage 40ª, but a by-pass pipe 42 leads from the two sides of the division wall 41, shown in lower position in Fig. 5. The drain pipe 42ª leads from the by-pass pipe 42, and at the point of junction of the pipes 42 and 42ª is provided the by-pass valve 43, so that on opening of this valve, liquid may pass into drain pipe 42ª from both sides of the division wall 41, while on closing valve 43 communication between opposite sides of division wall 41 and also with the pipe 42ª is interrupted.

Immediately inside of the perforated inner shell 38 is placed the retaining screen 44. Inside of this retaining screen in turn is the filter cloth 45, and inside of the filter cloth is the spreading screen 46. The object of the retaining screen 44 and the spreading screen 46 is to hold the filter cloth 45 securely in position. The retaining screen 44, the filter cloth 45, and the spreading screen 46 are preferably made each in two pieces, each of these two pieces extending approximately half way around the inner surface of the inner shell 38. The spacing angles 47 fastened to the inner shell 38 by the bolts or rivets 48 are located diametrically opposite to each other. The edges of the retaining screen 44 terminate at or near the outer edges of these spacing angles 47. The edges of the filter cloth 45 are held in position between the inner surfaces of the spacing angles 47 and the clamping angles 49. The latter are held in position by means of the clamping rods 50, each of which has on its outer end the engaging member 51. Between each pair of clamping rods 50 is the sleeve nut 52, by means of which the clamping angles 49 are forced outwardly in order to securely clamp the ends of the filter cloth 45 in position. The engaging members 51 also engage the retaining rods 53 placed at the edges of the spreading screen 46, and serve to hold the latter in position. It will be evident that by this construction the filter cloth 45, and, if necessary, the retaining and spreading screens 44 and 46, may be quickly and easily removed and renewed by first loosening the sleeve nut 52 and then removing the clamping rods 50.

The extraction drum 21 is closed at its ends by the head plates 54 and 55, which are held in position by means of suitable bolts 56 and 57. The head plate 54 is provided with two apertures, namely, the ore charging hole 58 and the sluicing hole 59. The ore charging hole 58 is normally closed by the cover 60 held in position by the bolt 61 and the sluicing hole 59 is closed by the cover 62 held in position by the bolt 63. The head plate 54 has passing through it the solution pipe 64 with the valve 65 therein.

As shown in Figs. 3, 5 and 6, the pipes 65ª may be provided leading from the solution chamber 40 at the same end of the extraction drum as that on which the head plate 54 is located. These pipes 65ª unite with a pipe 65ᵇ which communicates with pipe 65ᶜ by the slip joint 65ᵈ. The valve 65ᵉ is located in the pipe 65ᶜ and controls the flow of solution from the solution chamber 40.

The head plate 55 has passing through its center a pipe 66 provided with the valve 67. Connected with the pipe 66 is a pipe 68, the sleeve 69 being placed between the pipes 66 and 68 so that a connection is afforded between these two pipes, while it is unnecessary to disconnect them on rotation of the extraction drum 21 with which the pipe 66 rotates. The pipe 68 is connected with the pipes 70 and 71, in which are the valves 72 and 73, respectively. The pipe 70 communicates with a suitable source of high pressure air, while the pipe 71 connects with a source of water. If desired, a suitable valved pipe connecting with a source of steam may also be connected with the pipe 68.

The head plate 55 has the aperture 74 therein with which the pulp and slime discharge valve 75 is connected. The valve 75, as clearly shown in Fig. 4, is preferably a gate valve, and is operated by the handle 76.

Leading from the outer shell 30 are the solution discharge pipes 77 and 77ᵃ (preferably two in number), controlled by the valves 78 and 78ᵃ. When two discharge pipes, as 77 and 77ᵃ, are employed, they are located on opposite sides of the division wall 41 with which the by-pass 42 is associated, as clearly shown in Fig. 5. The head plate 55 is also provided with the air check valves 79 and 79ᵃ, the purpose of which will be hereafter described.

Having thus described the apparatus used in connection with my invention, the method of operation may now be readily understood. For the sake of simplicity, I will describe my process as used in connection with the cyaniding of gold ores, it being understood that other solutions for the extraction of other metals may be used without departing from the spirit of my invention. After the ore has been finely crushed, it is introduced into the leaching chamber 80 of the extraction drum through the ore charging hole 58, the cover 60 being removed for the purpose. This cover is then replaced. If the ore has been crushed wet, the drum is rotated and stopped with the by-pass valve 43 in its lowermost position. During this rotation water has passed from the ore through the filter cloth 45. Air is now introduced through the valve 79 and serves to clean the filter cloth 45 on its passage from the solution chamber 40 to the leaching chamber 80. The by-pass valve 43 (which is normally closed) is opened in order to allow all of the water accumulating in the solution compartment 40 to drain off through pipes 42 and 42ᵃ, this action being facilitated by the pressure of air within the extraction drum. By this method of filtering the thickening operation is greatly facilitated and the separation of the ore into silicious pulp and slimes is entirely avoided. If the ore has been crushed dry, or in the case of wet ores after the filtering just described has taken place, the cyanid solution is next introduced. This is accomplished by opening the valve 65 and allowing the cyanid to flow into the central or leaching chamber contained within the inner shell 38. If preferred, the cyanid solution may be introduced through the ore charging hole 58, before the cover 60 is placed in position in the case of dry-crushed ores, or by removing this cover after the filtering operation has been completed in the case of the wet-crushed ores. The thickening operation as above described may be entirely eliminated if desired by omitting the filtering operation and adding to the wet ore a concentrated cyanid solution through pipe 64 and valve 65, so that when this concentrated solution is diluted by the known amount of water introduced with the ore pulp, a standard cyanid solution of correct strength is formed. A sufficient amount of cyanid is introduced so that the leaching chamber is nearly filled with the ore and solution. The solution is preferably heated before it is introduced, inasmuch as the extraction process is thereby considerably aided. All valves and openings of the extraction drum being now closed, the latter is rotated by means of the main driving shaft 35. By the constant tumbling of the ore with the cyanid solution the latter is caused to percolate thoroughly through the ore. After a thorough mixture of the ore and solution has been obtained air or steam or both are introduced into the leaching chamber through the pipe 66 until the pressure within that chamber reaches from 15 to 60 pounds, according to the quality of the ore being treated. The pressure within the extraction drum serves to promote the oxidation and leaching of the ores, and when steam is employed the increased temperature also serves to hasten the action. The drum is then allowed to revolve slowly for a period of from two to eight hours, depending on the character of the ore. As the drum rotates the solution passes through the filter cloth 45 into the solution compartment 40. The by-pass valve being closed, the division walls 41 serve to lift the filtered solution to the upper portion of the drum as the latter rotates, and the solution again returns through the filter cloth to the leaching chamber. This operation is repeated over and over again until the gold contained in the ore passes into the solution. When this operation has been conducted a sufficient length of time so that all gold has been extracted from the ores, the drum is stopped with the valve 78 in its lowermost position. The solution which is at that time within the leaching chamber passes through the filter cloth 45. The clear gold bearing cyanid solution is then withdrawn through the pipe 77 by opening the valve 78. At the same time air is introduced into the solution compartment 40 through the air check valve 79 in order to aid the expulsion of the cyanid solution from the solution compartment 40 and leaching chamber 80, and to clean the filter cloth by forcing air through it and by causing some of the solution from compartment 40 to flow into the leaching chamber 80. The drum is now revolved so as to bring the discharge valve 78ᵃ to its lowermost position. The remaining clear gold bearing solution is then withdrawn from the leaching chamber 80 and the solution compartment 40 through the pipe 77ᵃ by opening the valve 78ᵃ. At the same time air is introduced into the solution compartment 40 through the air check valve 79ᵃ in order, as before, to aid the expulsion of the solution, and to clean the filter cloth 45. The gold bearing cyanid solution is carried to the solution tank 22ᵃ, and the gold is subsequently precipitated from it; but this portion of the process forms no part of the present invention. If desired, the gold bearing solution may be withdrawn from the solution chamber 40 during rotation of the extraction drum by opening the valve 65ᵉ thereby causing the cyanid solution to pass through the pipes 65ᵃ into the solution discharge pipe 65ᶜ. After the cyanid solution has been expelled from the solution compartment 40, the valves 78 and 78ᵃ, or 65ᵉ as the case may be, are closed, and water is introduced into the leaching chamber by opening the valves 73 and 67, the valve 72 meanwhile being closed. At the same time the extraction drum 21 is revolved in order to make the washing process complete. Another method of introducing the water is through valve 65, after which the drum is revolved. The water serves to remove from the pulp and slimes contained within the leaching chamber all of the remaining cyanid solution, which passes through the filter cloth 45 into the solution compartment, and on stopping the drum this solution is removed through the discharge pipes 77 and 77ᵃ in exactly the same manner that the original cyanid solution was removed as above described, the filter cloth being cleaned meantime by the action of the air introduced through the valves 79 and 79ᵃ. This solution may also be removed through the pipes 65ᵃ and 65ᶜ during rotation of the drum, as described above. The drum is then revolved so that the by-pass valve 43 is brought to its lowermost position. The valve 43 is then opened and the remainder of the solution in the compartment 40 is drawn off through the pipes 42 and 42ᵃ. This washing water is then taken to the solution tank 22ᵃ and added to the metal bearing solution which has previously been placed in said tank. By means of the washing process which has just been described, it will be evident that no gold values are lost either in the slimes or the pulp of the ores. After the drum has been stopped and the washing water drawn off, as just described, the cover 60 is removed from the ore charging hole 58 and the cover 62 from the sluicing hole 59, and high pressure water is introduced into the drum through these holes. The gate valve 75 having been opened before the sluicing operation is begun, the pulp and slimes contained within the leaching chamber are carried through the opening 74 past the discharge valve 75, and these tailings are then carried by a belt conveyer or otherwise to a suitable dump or other place of disposal. Any water accumulating in the solution compartment 40 drains off through the pipes 42 and 42ᵃ.

I have described my invention as particularly used in connection with the cyaniding of gold ores, but it will be understood that the chlorination process may be used with equal facility. In the latter case the chlorin gas is introduced into the leaching chamber through the pipe 66, or, if preferred, the acid and chlorid of lime are placed in the leaching chamber so that the chlorin gas is generated therein. When the chlorination process is used, all metal surfaces inside of the drum are enameled in order to prevent the steel from being attacked by the chlorin gas. If desired, in this process the interior parts may also be made of wood, or the metal parts may be treated with asphaltum.

In the case of silver ores the hypo-sulfite solution is used instead of the cyanid or chlorination process, but the sequence of steps constituting my distinctive process and the apparatus used are the same as previously described.

It will be apparent to those skilled in the art that many changes may be made in the details of the method of operation and in the apparatus which I have described without departing from the spirit or scope of my invention.

What I claim is:

1. In an apparatus for extracting metals from ores, the combination of a drum, means for rotating said drum, filtering means spaced inwardly from the periphery of said drum whereby an annular solution chamber is formed between said periphery and said filtering means and a leaching chamber is formed within said filtering means, means for retaining said filtering means in position, and means for introducing a gas under pressure into said solution chamber whereby said filtering means is cleansed from material in said leaching chamber accumulating on said filtering means.

2. In an apparatus for extracting metal from ores, the combination of a cylindrical drum having end plates therefor, one of said end plates having an ore charging aperture therein, means for closing said aperture, a perforated shell mounted concentrically with the outer shell of said drum whereby a solution chamber is formed between the outer shell of said drum and said inner shell and a leaching chamber is formed within said inner shell, a filter cloth fastened to said perforated shell, a division wall extending longitudinally through said solution chamber, means for introducing fluid into said leaching chamber, a valved solution outlet from said solution chamber, a valved discharge outlet from said leaching chamber, means for introducing air into said solution chamber, and means for rotating said drum.

3. In apparatus of the class described, the combination of a closed rotatable drum, filtering means dividing said drum into a pair of chambers, said drum having an aperture for charging ore into one of said chambers and means for closing said aperture, means for charging an extracting fluid into said drum to enter said first chamber, and means for introducing a non-extracting fluid into the other of said chambers.

4. In apparatus of the class described, the combination of a rotatable cylindrical drum having end plates therefor, filtering means spaced inwardly from the periphery of said drum, whereby the latter is divided into an inner chamber and an outer annular chamber, one of said end plates having an aperture for charging ore into one of said chambers and means for closing said aperture, means for introducing a metal-extracting fluid into said drum to enter said ore-receiving chamber, and means for introducing a non-extracting fluid into the other of said chambers.

5. In apparatus of the class described, the combination of a rotatable cylindrical drum having end plates therefor, filtering means spaced inwardly from the periphery of said drum, whereby it is divided into an inner leaching chamber and an outer solution chamber, one of said end plates having an aperture for charging ore into said leaching chamber and means for closing said aperture, means for introducing a metal-extracting fluid into said leaching chamber, and means for introducing a non-extracting fluid under pressure into said solution chamber.

6. In apparatus of the class described, the combination of a rotatable cylindrical drum having an outer metal shell and an inner perforated metal shell spaced inwardly from said outer shell, whereby an inner chamber and an outer annular chamber are formed, a filtering medium carried by said inner shell, means for closing the ends of said annular chamber, and removable heads for closing the ends of said inner chamber.

In witness whereof, I hereunto subscribe my name this 24th day of July, A. D. 1914.

BRUNO R. KOERING.

Witnesses:
CHAS. P. BENOIT, Jr.,
H. M. LIVINGSTON.